United States Patent [19]
De Andrea

[11] 3,826,021
[45] July 30, 1974

[54] DEVICE FOR DEMONSTRATING AND CALCULATING TRIGONOMETRIC FUNCTIONS

[76] Inventor: Joseph D. De Andrea, 349 S. Aiken Ave., Pittsburgh, Pa. 15232

[22] Filed: June 14, 1973

[21] Appl. No.: 369,915

[52] U.S. Cl.............................. 35/34, 235/61 GM
[51] Int. Cl. ........................................... G09b 23/04
[58] Field of Search ... 35/34, 30; 235/61 B, 61 GM; 33/76 VA

[56] References Cited
UNITED STATES PATENTS

| | | | |
|---|---|---|---|
| 1,955,392 | 4/1934 | Shimberg | 35/34 |
| 2,509,301 | 5/1950 | Henry | 35/34 |
| 3,021,058 | 2/1962 | Horton | 235/61 B |
| 3,610,519 | 10/1971 | Radosavljevic | 35/34 X |

*Primary Examiner*—Wm. H. Grieb
*Attorney, Agent, or Firm*—Webb, Burden, Robinson & Webb

[57] ABSTRACT

A device for demonstrating and calculating trigonometric functions comprising a planar member having a unit circle inscribed thereon and an angular scale associated therewith to indicate the angle of an arc measured thereon. The planar member also includes a vertically extending, ordinate corridor, defined by the ordinate axis and tangent line and a horizontally extending, abscissa corridor defined by the abscissa axis and cotangent line. The corridors extend outwardly from the unit circle and have numerical indicia associated therewith, linearly calibrated along said corridors wherein the radius of the unit circle is the value 1. A transparent cursor member having a radius vector hairline is pivotally mounted at the origin of the unit circle with the hairline passing through the origin and extending a length at least as great as that of said corridors. The tangent, contangent, secant and cosecant functions for a given angle inscribed by the radius vector hairline within the unit circle may be demonstrated and calculated by visual observation of the radius vector hairline as it is moved within the corridors. The numerical values for the tangent, cotangent, secant and cosecant functions are determined by the points of intersection of the radius vector hairline with the tangent and cotangent lines and the corresponding numerical indicia associated therewith. A further embodiment of my invention is disclosed wherein the planar member also includes means for indicating sine and cosine functions within the unit circle to permit the demonstration and calculation of all of the trigonometric functions on a single device.

8 Claims, 4 Drawing Figures

DEVICE FOR DEMONSTRATING AND CALCULATING TRIGONOMETRIC FUNCTIONS

My invention relates to a device which is useful for demonstrating and calculating trigonometric functions. The student of trigonometry is often times confused by the interractions between the various trigonometric functions. I have found that the study of trigonometry is made much easier if the student, at the outset, can visually conceive the relationship of the various trigonometric functions relative to one another and to the basic unit circle. Prior devices have attempted to solve this problem but have failed since many of these prior devices are relatively complex to operate and only add to the student's problems. Likewise, many of these prior devices have been directed to the demonstration and/or calculation of only a portion of the trigonometric functions, particularly, only the sine and cosine functions.

My invention solves the problems heretofore encountered by providing a device which visually demonstrates the variable functions of trigonometry in a manner which is easily understood and also simple to operate.

My invention provides a device which permits the visual demonstration of tangents, cotangents, secants and cosecants, simultaneously, to enable the student to become aware of and thus gain a better understanding of the interaction between these trigonometric functions.

Another embodiment of my invention provides a device which demonstrates all of the trigonometric functions, namely, sines, cosines tangents, cotangents, secants, and cosecants.

My invention further provides a device which is useful as an instructional tool in the classroom and a device which also is useful as a calculator, whereby the user may easily obtain the particular numerical values for the various trigonometric functions.

Briefly, my invention provides a device for demonstrating and calculating trigonometric functions comprising a planar member having a unit circle inscribed thereon and an angular scale associated with the circle to indicate the angle of an arc measured thereon. The planar member also has a vertically extending ordinate corridor defined by the ordinate axis and tangent line and a horizontally extending abscissa corridor defined by the abscissa axis and cotangent line. The ordinate and abscissa corridors extending outwardly from the unit circle are visually observable on the planar member with numerical indicia associated therewith, linearly calibrated along said corridors wherein the radius of the unit circle is the value 1. A transparent cursor member having a radius vector hairline is pivotally mounted at the origin of the unit circle with the hairline passing through the origin and extending a length at least as great as that of said corridors; the cursor member adapted to be pivotally moved through at least a 90° quadrant of the unit circle. The tangent, cotangent, secant and cosecant functions for a given angle inscribed by the radius vector hairline within the unit circle may be demonstrated and calculated by visual observation of the radius vector hairline within the corridors at its points of intersection with the tangent and cotangent lines and the numerical indicia associated therewith. An additional presently preferred embodiment of my invention comprises a planar member also including means for indicating sine and cosine functions within the unit circle to permit the demonstration and calculation of all of the trigonometric functions on one device.

Figure 1:
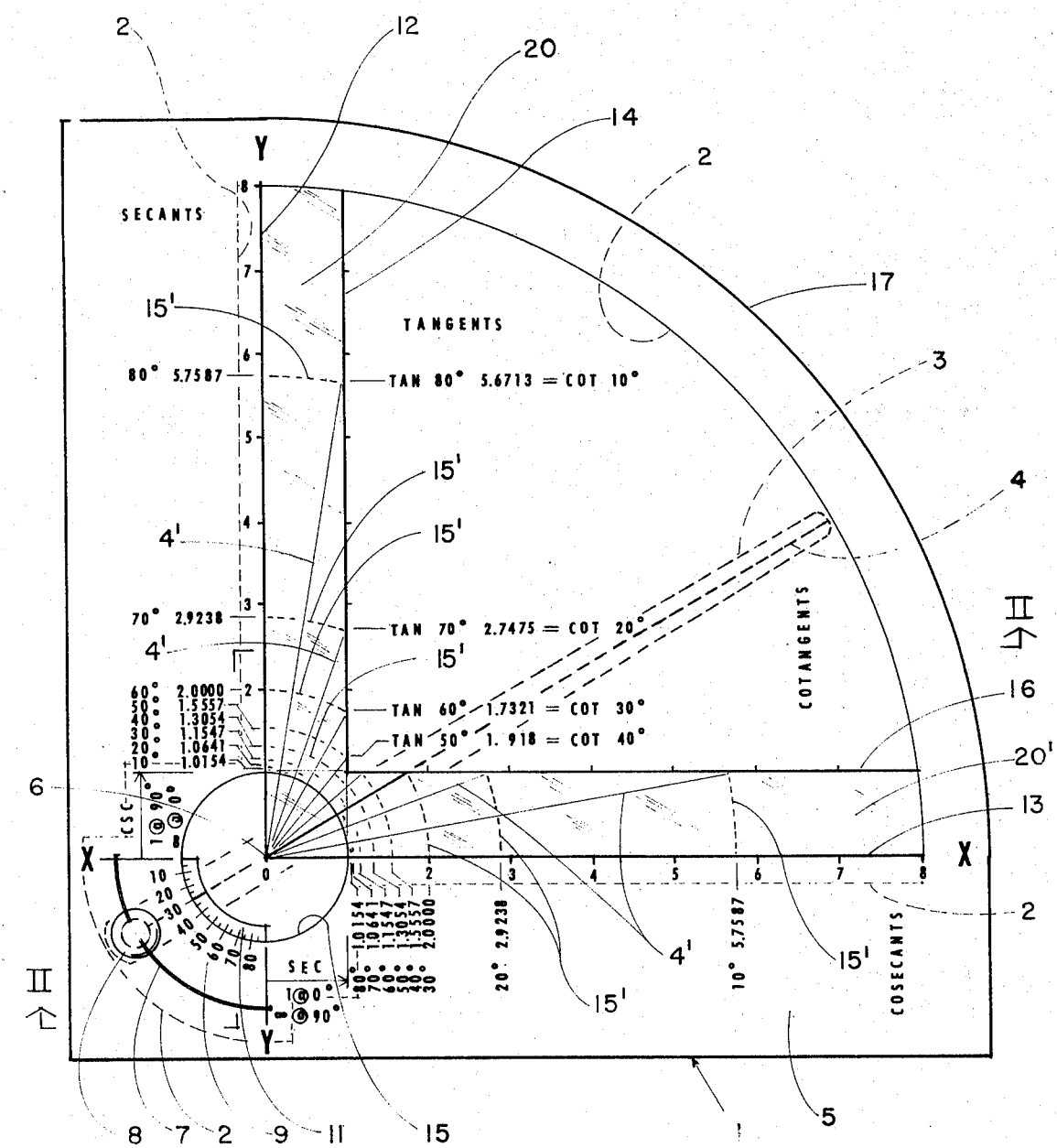
FIG. 1 is a plan view of one presently preferred embodiment of my invention wherein tangent, cotangent, secant and cosecant functions may be demonstrated and calculated.

Referring now to the specific details of the drawings, FIG. 1 shows a presently preferred embodiment of my device which is useful for demonstrating and calculating tangent, cotangent, secant and cosecant functions. The device comprises a flat, planar member 1 which may be constructed of a plastic material such as used in the construction of circular slide rules and the like. Planar member 1 has an upper surface 5 and a lower surface 10, each disposed on opposite faces thereof. A unit circle 15 is imprinted or inscribed on upper surface 5 of planar member 1 and angular scale 9 is positioned adjacent unit circle 15 to indicate the inscribed angle of an arc measured within circle 15. Angular scale 9 of FIG. 1 is shown as it would appear if 90° quadrant 50 of unit circle 15 is to be measured; however, angular scale 9 could be extended to encompass 360° of unit circle 15 if desired. It is, of course, known that all of the trigonometric functions can be demonstrated and calculated in one 90° quadrant of circle 15; since there is only a positive or negative sign change in the other quadrants.

Planar member 1 has an ordinate axis 12, vertically extending outwardly from the origin 6 of unit circle 15, also commonly referred to as the Y axis. Planar member 1 also has an abscissa axis 13 also referred to as the X axis disposed thereon, outwardly extending from the origin 6 of unit circle 15 in a horizontal direction, perpendicular to ordinate axis 12. A tangent line 14 extends from the circumference of unit circle 15 from the point of intersection with abscissa axis 13 and outwardly extends therefrom, running parallel with ordinate axis 12. Ordinate axis 12 and tangent line 14 define a vertically extending ordinate corridor 20, therebetween. Planar member 1 also has a cotangent line 16 disposed thereon, extending from the circumference of unit circle 15 at the point of intersection with ordinate axis 12 and extending outwardly therefrom running parallel to abscissa axis 13. Abscissa axis 13 and cotangent line 16 define a horizontally extending abscissa corridor 20' therebetween. Numerical indicia are placed on planar member 1 adjacent abscissa corridor 20' and ordinate corridor 20, the indicia being linearly calibrated with respect to the radius of unit circle 15 wherein the radius of circle 15 is given the unit value 1, with origin 6 given the value 0. The indicia may be imprinted or inscribed on planar member 1 as in the manner of conventional slide rule indicia.

A transparent cursor member 3 having a radius vector hairline 4 extending linearly thereon, is pivotally mounted on planar member 1 at origin 6 of unit circle 15 with the radius vector hairline 4 passing through origin 6. The pivotal connection at origin 6 may be made with a pin, small rivet or other conventional connector. In the sectional view of FIG. 2 it can be seen that planar member 1 has an open interior 2 into which the cursor member 3 is free to pivotally move at least 90° within a quadrant of unit circle 15 so that radius vector hairline 4 is visually observable when cursor member 3 is pivotally moved through the ordinate and abscissa corridors 20, 20', respectively.

The arc of an angle inscribed by radius vector hairline 4 within unit circle 15 is visually observed on angular scale 9 by way of cutout portion 11 through upper surface 5 of planar member 1. Cutout portion 11 is positioned adjacent angular scale 9 to permit visual observation of radius vector hairline 4 therethrough, whereby the inscribed angle of any arc may be measured by observation of the point of intersection of hairline 4 with angular scale 9. Upper surface 5 also contains elongated slots therethrough which communicate with interior portion 2, said slots coextensive with ordinate and abscissa corridors 20, 20' to permit visual observation of radius vector hairline 4 therethrough. Preferably elongated slots at 20, 20' contain a transparent cover member of plastic therein. The transparent cover member at 20, 20' may have inscribed thereon the 90° arc of quadrant 50 of circle 15 and also portions of tangent line 14 and cotangent line 16 which extend across corridors 20' and 20, respectively. It is preferable to mount cursor member 3 within interior portion 2 as shown in FIG. 1 since, in this manner, radius vector hairline 4 is only visible when it passes through the ordinate and abscissa corridors. If cursor member 3 were mounted on upper surface 5 it would be completely visible and may confuse the student. It can be appreciated, however, that cursor member 3 could be mounted on upper surface 5 of planar member 1 in which case the need for open interior portion 2, elongated slots 20, 20', and cutout portion 11 would be eliminated. As previously stated, however, it is preferable to place cursor member 3 within interior 2 in order to visually simplify the operation for the student.

Figure 2:
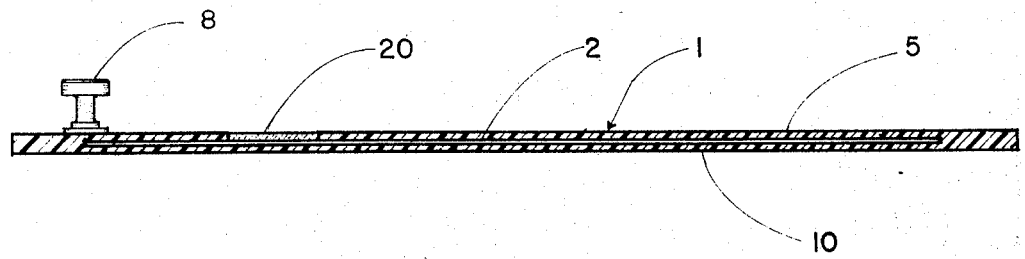
FIG. 2 is a sectional view taken along line II—II of FIG. 1.

Still referring to the specific embodiments of FIGS. 1 and 2, transparent cursor member 3 has a knob 8 attached at one end thereof which extends outwardly therefrom. Upper surface 5 of planar member 1 has a curved slot 7 formed therethrough to allow the attachment of knob 8 to cursor member 3. Knob 8 is threadably attached to cursor member 3 to allow the cursor member 3 to be threadably locked in position at any given value on angular scale 9. If cursor member 3 is to be moved, knob 8 could be threadably loosened within slot 7 and moved to a different angular value and then resecured by threadable movement. Cursor member 3 could also be pivotally moved using a slightly different construction. In such a modified construction, cursor member 3 would extend beyond the edge of planar member 1 whereby the user would merely grasp the exposed end in order to pivotally move cursor member 3 within the 90° quadrant of unit circle 15. Naturally, if cursor member 3 contained an extended portion, open interior portion 2 would extend outwardly to the terminal edge curved portion 17 of planar member 1 (not shown on FIG. 2).

Planar member 1 may also contain additional guidelines and numerical indicia positioned thereon in order to aid the student. Radial guidelines 4' may be imprinted or inscribed on planar member 1, extending from origin 6 of unit circle 15 outwardly within corridors 20, 20' in order to represent the position of radius vector hairline 4 as it would appear at various angular increments, such as 10° increments. In the embodiment of FIG. 1 transparent cursor member 3 is shown with the radius vector hairline 4 set at 30° on scale 9. At this setting the tangent value is demonstrated as the length of tangent line 14 from its point of intersection with abscissa axis 13 to its point of intersection with radius vector hairline 4. The corresponding cotangent value of the 30° angle is the length of the cotangent line 16 from its point of intersection with ordinate axis 12 to its point of intersection with radius vector hairline 4. The secant value for 30° is the length of the radius vector hairline 4 from origin 6 to its point of intersection with tangent line 14.

Curved scribe lines 15' may also be positioned on planar member 1 within corridors 20, 20'; scribe lines 15' being concentric with the radial center of unit circle 15 wherein the length of radius vector hairline 4 at its points of intersection with tangent and cotangent lines 14 and 16 may be determined by the intersection of adjacent scribe lines 15' with the ordinate and abscissa axes 12 and 13. As can be seen in FIG. 1 the secant value is indicated by a scribe line 15' which intersects the point of intersection of radius vector hairline 4 and tangent line 14 and the corresponding value of 1.1547 is shown adjacent ordinate axis 12. The corresponding cosecant value is demonstrated by the length of radius vector hairline 4 from the origin 6 to its point of intersection with cotangent line 16 along abscissa corridor 20'. The cosecant value for 30° is shown on the abscissa axis 13 by following a scribe line 15' from the point of intersection of radius vector hairline 4 with cotangent line 16 to abscissa axis 13, wherein the value shown is 2. Hence, the device of the embodiment of FIG. 1 demonstrates the various relationships between tangents, cotangents, secants and cosecants wherein the student can visually determine that tangent values range between 0 at 0° to infinity at 90°; cotangent values range between infinity at 0° and 0 at 90°; secant values range between 1 at 0° and infinity at 90°; and cosecant values range between infinity at 0° and 1 at 90°. The study of trigonometry is thus made easier when the student visually conceives the principle that tangent and secant functions occur within ordinate corridor 20 and cotangent and cosecant functions occur within abscissa corridor 20'.

The physical size of planar member 1 may vary according to the application. The embodiment of FIG. 1 shows the ordinate corridor and abscissa corridors 20, 20' extending outwardly from unit circle 15 a distance of 8 unit lengths. These distances may be shortened or lengthened according to the size and degree of accuracy required. Theoretically, the corridors 20, 20' and radius vector hairline extend to infinity, since parallel lines never intersect. If a calculating device is desired, more detailed numerical indicia may be required along corridors 20, 20' in order to more closely indicate the various numerical values of the trigonometric functions. The presently preferred embodiment of FIG. 1 is shown as it would appear in an instructional device wherein fewer numerical indicia are imprinted on planar member 1 so as to lessen the degree of complexity for the student. Such a device would serve as a useful instructional tool when used in conjunction with an overhead projector in the classroom.

Figure 3:
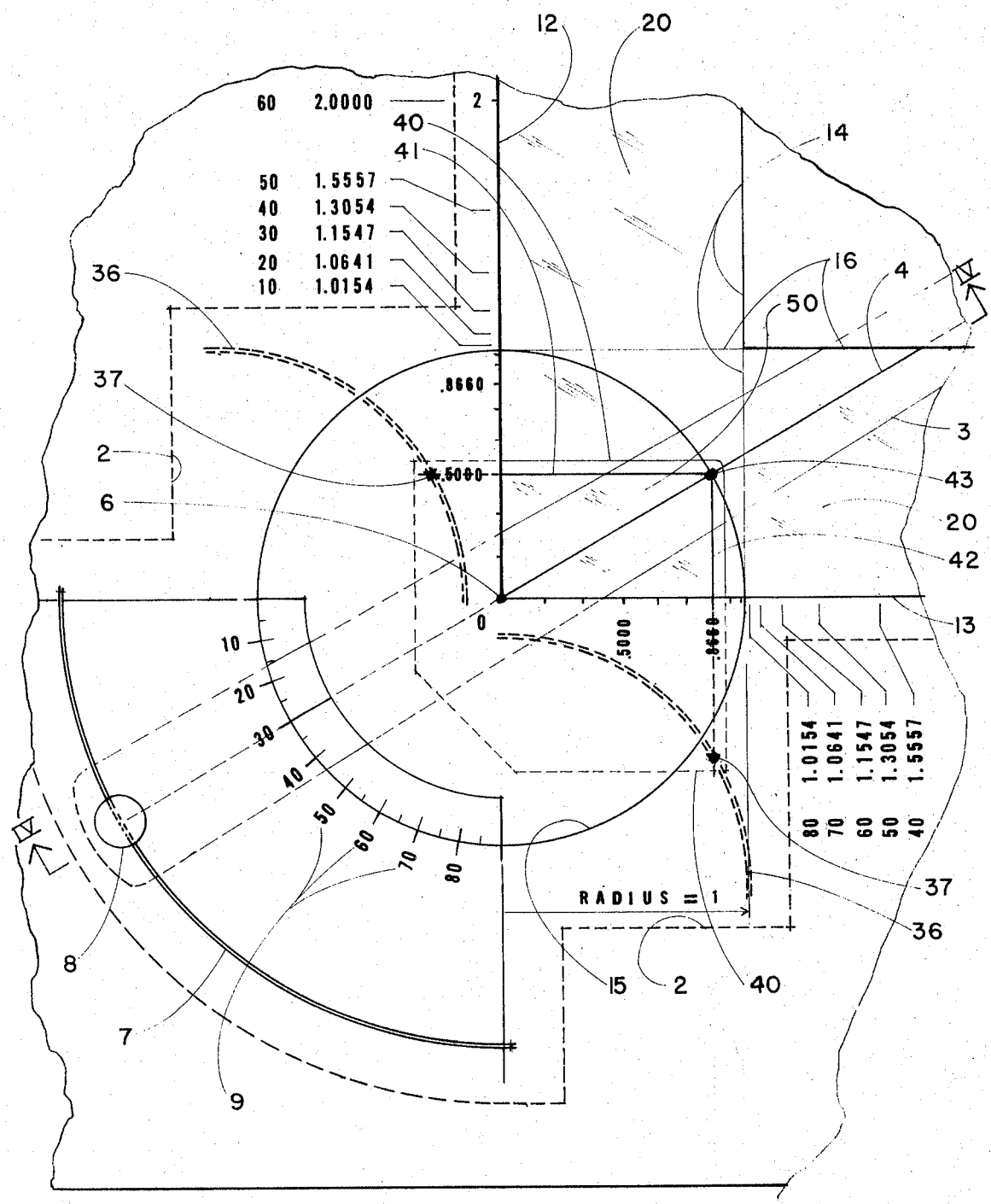
FIG. 3 is a partial plan view of a modified embodiment of the device of FIG. 1 wherein sine and cosine indicator means are positioned on the planar member associated with the unit circle.
Figure 4:
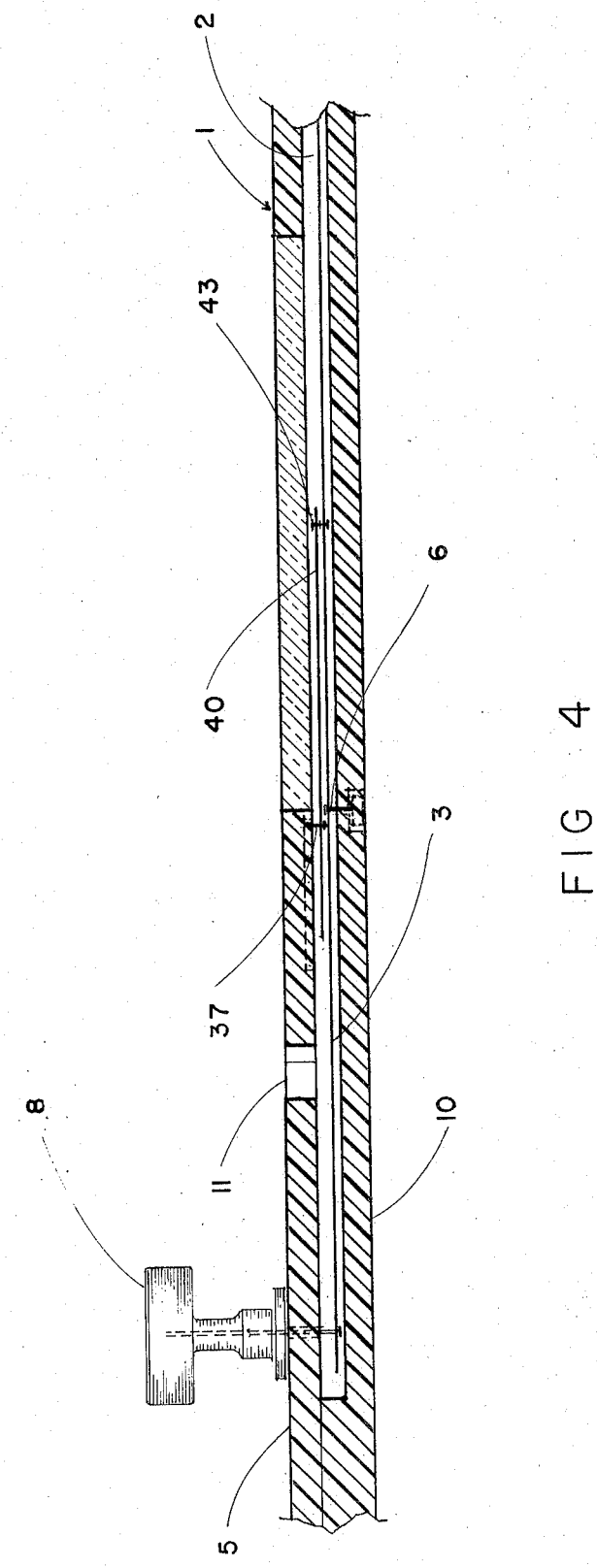
FIG. 4 is a sectional view taken along line IV—IV of FIG. 3.

Referring now to FIGS. 3 and 4, planar member 1 may also contain the addition of a transparent flat indicator member 40 to permit the student to visually observe sine and cosine functions within unit circle 15. Flat indicator member 40 is movably positioned within open interior portion 2 of planar member 1. Numerical indicia are positioned on planar member 1 adjacent the ordinate and abscissa axes 12 and 13, respectively; said indicia being literally calibrated from 0 at origin 6 of unit circle 15 to 1 at its circumference; the radius of unit circle 15 defining one unit length along each axis. Flat indicator member 40 has two intersecting perpendicular hairlines inscribed thereon, 41 and 42 respectively. Flat member 40 is pivotally mounted using a pin or rivet or the like to cursor member 3 at the point of intersection 43 of the perpendicular hairlines 41 and 42. The pivotal connection 43 is made along radius vector hairline 4, one unit length from origin 6 of unit circle 15. Planar member 1 also contains alignment tracks 36 positioned in spaced relationship within interior 2. Alignment tracks 36 being formed to describe 90° arcs of unit circle 15. Alignment tracks 36 intersect opposite quadrants of unit circle 15, adjacent the quadrant 50. Flat indicator member 40 also has a pair of alignment pins 37 attached thereto, the ends of pins 37 movably positioned within each of said alignment tracks 36 to maintain the angular alignment of flat indicator member 40 when cursor member 3 is pivotally moved through a 90° quadrant of unit circle 15. Alignment pins 37 are preferably positioned at the terminal ends of hairlines 41 and 42. Hence, when cursor member 3 is moved through a 90° quadrant of unit circle 15, alignment pins 37 slidably move within alignment tracks 36 to maintain hairlines 41 and 42 in a perpendicular relationship to the ordinate and abscissa axes 12 and 13, respectively. In order to permit free movement of flat indicator member 40 within open interior 2, pivotal connection 6 of the cursor member 3 should preferably be made at the lower surface 10 of planar member 1 so that the flat indicator member 40 is free to move above cursor member 3 and pivotal connection 6, FIG. 4.

The sine value of an inscribed angle within unit circle 15 is demonstrated by the length of hairline 42 from pivotal intersection point 43 to its point of intersection with abscissa axis 13. As stated, the length of line 42 is the value of the sine of the inscribed angle, which sine value may be read directly from the ordinate axis 12 at its point of intersection with perpendicular hairline 41. Conversely, the cosine value of an inscribed angle within unit circle 15 is determined by the length of hairline 41 from pivotal intersection point 43 to its point of intersection with ordinate axis 12. This cosine value may be directly read on the abscissa axis 13 at the point of intersection with perpendicular hairline 42. As can be seen in FIG. 3, the sine value for 30° is the length of hairline 42 which is shown on the ordinate axis 12 as the value 0.5000. The corresponding cosine value for 30° is determined by the length of hairline 41 which value can be read directly on abscissa axis 13 and is shown as 0.8660. The embodiment of FIG. 3 permits the student to visually comprehend the dynamic relationship between sine and cosine functions wherein the sine function varies from 0 at 0° to 1 at 90° and conversely the cosine value varies from 1 at 0° to 0 at 90°.

By using the embodiment of FIG. 3, the student can likewise visually demonstrate and calculate all of the trigonometric functions: sines, cosines, tangents, cotangents, secants and cosecants in a single device.

As can be seen in FIGS. 1 and 3, ordinate corridor 20 extends through a 90° quadrant 50 of unit circle 15 and terminates at abscissa axis 13. Abscissa corridor 20', likewise, extends through quadrant 50 and overlaps ordinate corridor 20, terminating at ordinate axis 12. Due to the fact that corridors 20, 20' contain a transparent cover, quadrant 50 also has the same visually transparent properties. The remaining area of unit circle 15 is opaque which hides from view portions of perpendicular lines 41 and 42 which extend beyond axes 12 and 13 of quadrant 50. Hence, only the operable portions of the sine and cosine hairlines 41 and 42 are visually observable within quadrant 50 which lessens the chances of confusion and error for the student.

The quantity of numerical indicia associated with ordinate and abscissa axes 12 and 13 within unit circle 15 and along corridors 20, 20' may vary to suit the intended purpose. Hence, the indicia may be less detailed for instructional devices so as to lessen the complexity of the device for the unskilled student. Conversely, if a calculating device is desired, the numerical indicia may be more detailed so that the various trigonometric values may be more easily determined, lessening the need for interpolation between indicia along abscissa and ordinate axes 13 and 12, and tangent and cotangent lines 14 and 16.

In order to further decrease the complexity of the device, the various trigonometric functions and the corresponding numerical indicia associated therewith may be imprinted on planar member 1 using a different color for each function. For example, the secant values along ordinate axis 12 may be imprinted in blue and the corresponding guidelines 15' within ordinate corridor 20 may likewise be imprinted in blue. The tangent values along tangent line 14 may be printed in green. The cotangent values along cotangent line 16 could likewise be imprinted in green or a different color if desired. Cosecant values along abscissa axis 13 and their corresponding guidelines 15' could be imprinted in red. Likewise, the indicia representing sine and cosine values may be imprinted in different colors. In this manner the student can visually determine, by color, the proper axis and corridor in which the functions operate.

While several of the presently preferred embodiment of my invention have been shown and described herein, it is clear that minor modifications could be made without departing from the scope of the appended claims.

I claim:

1. A device for demonstrating and calculating trigonometric functions, comprising:

a. a flat planar member including an upper surface and a lower surface disposed on opposite flat faces thereof and having an open interior portion therebetween, said planar member also having a unit circle inscribed on the upper surface and a scale associated therewith to indicate the inscribed angle of an arc measured thereon in at least one quadrant of said circle, the upper surface of said planar member also including ordinate and abscissa axes extending perpendicularly from the origin of the unit circle and tangent and cotangent lines extending from the circumference of the unit circle and running parallel to the ordinate and abscissa axes respectively, the ordinate axis and tangent line defining a vertically extending, ordinate corridor therebetween and the abscissa axis and cotangent line defining a horizontally extending abscissa corridor therebetween, the interior portion of said planar member being visually observable within said corridors and the area of the upper surface adjacent said corridors being visually opaque, said planar member also including numerical indicia associated with said corridors, said indicia linearly calibrated with respect to the radius of the unit circle wherein the origin of said circle is the value 0 and the radius is the value 1; and b. a cursor member carrying a radius vector hairline thereon, pivotally mounted within the interior portion of the planar member with the radius vector hairline passing through the origin of the unit circle, said hairline being visually observable when the cursor is pivotally moved through the ordinate and abscissa corridors, whereby the arc of an angle inscribed by the radius vector hairline within the unit circle may be visually observed on the angular scale and the corresponding tangent and secant values of said angle may be visually observed along the ordinate corridor and the corresponding cotangent and cosecant values of said angle may be visually observed along the abscissa corridor.

2. The device of claim 1 wherein the planar member also has a curved slot formed through the upper surface adjacent the angular scale of said unit circle, said cursor member also including an adjustment knob attached thereto, said knob movably positioned in said curved slot whereby the cursor member may be pivotally moved 90° within the interior of the planar member by movement of said adjustment knob.

3. The device of claim 1 wherein the upper surface of the planar member has two elongated slots formed therethrough coextensive with the ordinate and abscissa corridors and including a transparent cover member positioned within said elongated slots.

4. The device of claim 1 wherein the upper surface also includes a cutout portion therethrough, communicating with the interior of the planar member and positioned adjacent the angular scale of the unit circle to permit visual observation of the radius vector hairline through said cutout portion, whereby the inscribed angle of any arc may be measured by observation of the point of intersection of said hairline with the angular scale.

5. The device of claim 1, including means associated with the planar member for indicating sine and cosine values of a given included angle within one quadrant of the unit circle.

6. The device of claim 5 wherein said sine and cosine indicating means includes: numerical indicia adjacent the ordinate and abscissa axes of the unit circle linearly calibrated from 0 at the origin of said circle to 1 at its circumference, said distance defining one unit length along each axis, said means also including a flat indicator member having two intersecting perpendicular hairlines of at least one unit length, said flat member pivotally mounted within the interior of said planar member to the cursor member one unit length from the origin of said circle at the point of intersection of the two perpendicular hairlines with the radius vector hairline, said indicating means also including a pair of alignment tracks positioned within the interior of the planar member in spaced apart relationship thereon, said tracks being formed to describe 90° arcs of the unit circle, said flat indicator member also having a pair of alignment pins attached thereto and movably positioned within each of said alignment tracks to maintain angular alignment of said flat indicator member, whereby said pair of hairlines remain perpendicular to the ordinate and abscissa axes respectively when said cursor member and flat indicator member are moved through a quadrant of said unit circle to permit visual observation of the sine and cosine values of an inscribed angle at the points of intersection of the pair of perpendicular hairlines with the ordinate and abscissa axes, respectively.

7. The device of claim 1 wherein the numerical indicia associated with said corridors are imprinted in a plurality of colors, a different color being assigned for each of the trigonometric functions.

8. The device of claim 1 wherein the planar member includes a plurality of radial guidelines inscribed thereon extending outwardly from the origin of the unit circle within the abscissa and ordinate corridors, said planar member also including a plurality of curved scribe lines positioned within the abscissa and ordinate corridors and concentric relative to the radial center of the unit circle.

* * * * *